United States Patent
Martin et al.

(10) Patent No.: US 9,109,452 B2
(45) Date of Patent: Aug. 18, 2015

(54) VORTEX GENERATORS FOR IMPROVED FILM EFFECTIVENESS

(75) Inventors: Thomas J. Martin, Easton Hampton, CT (US); Alexander Staroselsky, Avon, CT (US); Thomas N. Slavens, Vernon, CT (US); Mark F. Zelesky, Bolton, CT (US); Joel H. Wagner, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 583 days.

(21) Appl. No.: 13/488,858

(22) Filed: Jun. 5, 2012

(65) Prior Publication Data
US 2013/0323080 A1 Dec. 5, 2013

(51) Int. Cl.
*F01D 5/18* (2006.01)

(52) U.S. Cl.
CPC .......... *F01D 5/186* (2013.01); *F05D 2240/121* (2013.01); *F05D 2240/303* (2013.01); *F05D 2240/305* (2013.01); *F05D 2260/202* (2013.01); *F05D 2260/212* (2013.01); *Y02T 50/676* (2013.01)

(58) Field of Classification Search
CPC ......... F01D 5/141; F01D 5/145; F01D 5/186; F01D 25/12; F05D 2240/305; F05D 2240/31; F05D 2260/202; F05D 2260/212
USPC ............................................. 416/97 R, 236 R
See application file for complete search history.

(56) References Cited

U.S. PATENT DOCUMENTS

| | | | | |
|---|---|---|---|---|
| 3,463,418 | A | * | 8/1969 | Miksch ...................... 244/200.1 |
| 4,720,239 | A | * | 1/1988 | Owczarek .................... 415/181 |
| 5,337,568 | A | * | 8/1994 | Lee et al. ......................... 60/755 |
| 5,498,133 | A | * | 3/1996 | Lee .............................. 416/97 R |
| 5,609,470 | A | * | 3/1997 | Dodd ............................ 416/192 |
| 8,011,889 | B1 | | 9/2011 | Liang |
| 2009/0068023 | A1 | | 3/2009 | Liang |
| 2009/0155050 | A1 | | 6/2009 | Broomer et al. |
| 2010/0124485 | A1 | | 5/2010 | Tibbott |
| 2010/0221121 | A1 | | 9/2010 | Liang |
| 2010/0226789 | A1 | | 9/2010 | Liang |
| 2010/0239409 | A1 | | 9/2010 | Draper |

FOREIGN PATENT DOCUMENTS

EP 2236752 A2 10/2010
GB 2244520 A 12/1991

OTHER PUBLICATIONS

Patent Cooperation Treaty, International Search Report and Written Opinion, Mar. 25, 2014, 10 pages.
European Patent Office, European Search Report, May 4, 2015, 7 pages.

* cited by examiner

*Primary Examiner* — Ninh H Nguyen
(74) *Attorney, Agent, or Firm* — Kinney & Lange, P.A.

(57) ABSTRACT

An airfoil includes a suction surface, a pressure surface, a first showerhead cooling hole and a second showerhead cooling hole. The suction surface and the pressure surface both extend axially between a leading edge and a trailing edge, as well as radially from a root section to a tip section. The first showerhead cooling hole and the second showerhead cooling hole both extend into pressure surface near the leading edge. The first showerhead cooling hole and the second showerhead cooling hole are angled in opposing directions.

18 Claims, 6 Drawing Sheets

VORTEX GENERATORS FOR IMPROVED FILM EFFECTIVENESS

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

An airfoil includes a suction surface, a pressure surface, a first showerhead cooling hole and a second showerhead cooling hole. The suction surface and the pressure surface both extend axially between a leading edge and a trailing edge, as well as radially from a root section to a tip section. The first showerhead cooling hole and the second showerhead cooling hole both extend into the pressure surface near the leading edge. The first showerhead cooling hole and the second showerhead cooling hole are angled in opposing directions.

A component for a gas turbine engine includes a convex surface, a concave surface, bumps, upstream cooling holes, and downstream cooling holes. Both the convex surface and the concave surface extend radially from a root section to a tip section and axially from a leading edge to a trailing edge. The bumps extend transversely from the concave surface, have upstream ends located near the leading edge, and axially elongated centers extending towards the trailing edge. The upstream cooling holes have outlets located on the concave surface axially between the leading edge and the upstream ends of the bumps. The downstream holes have outlets located on the concave surface radially between the axially elongated centers of the bumps.

An airfoil for a gas turbine engine includes a pressure surface, a suction surface, and showerhead cooling holes. The pressure surface and the suction surface both extend between a leading edge and a trailing edge, as well as between a root section and a tip section. A portion of pressure surface has an undulating contour defined by peaks and troughs. The showerhead cooling holes have outlets on the pressure surface. The outlets of the showerhead cooling holes are located upstream of the portion of the pressure surface having the undulating contour.

DETAILED DESCRIPTION

Figure 1:
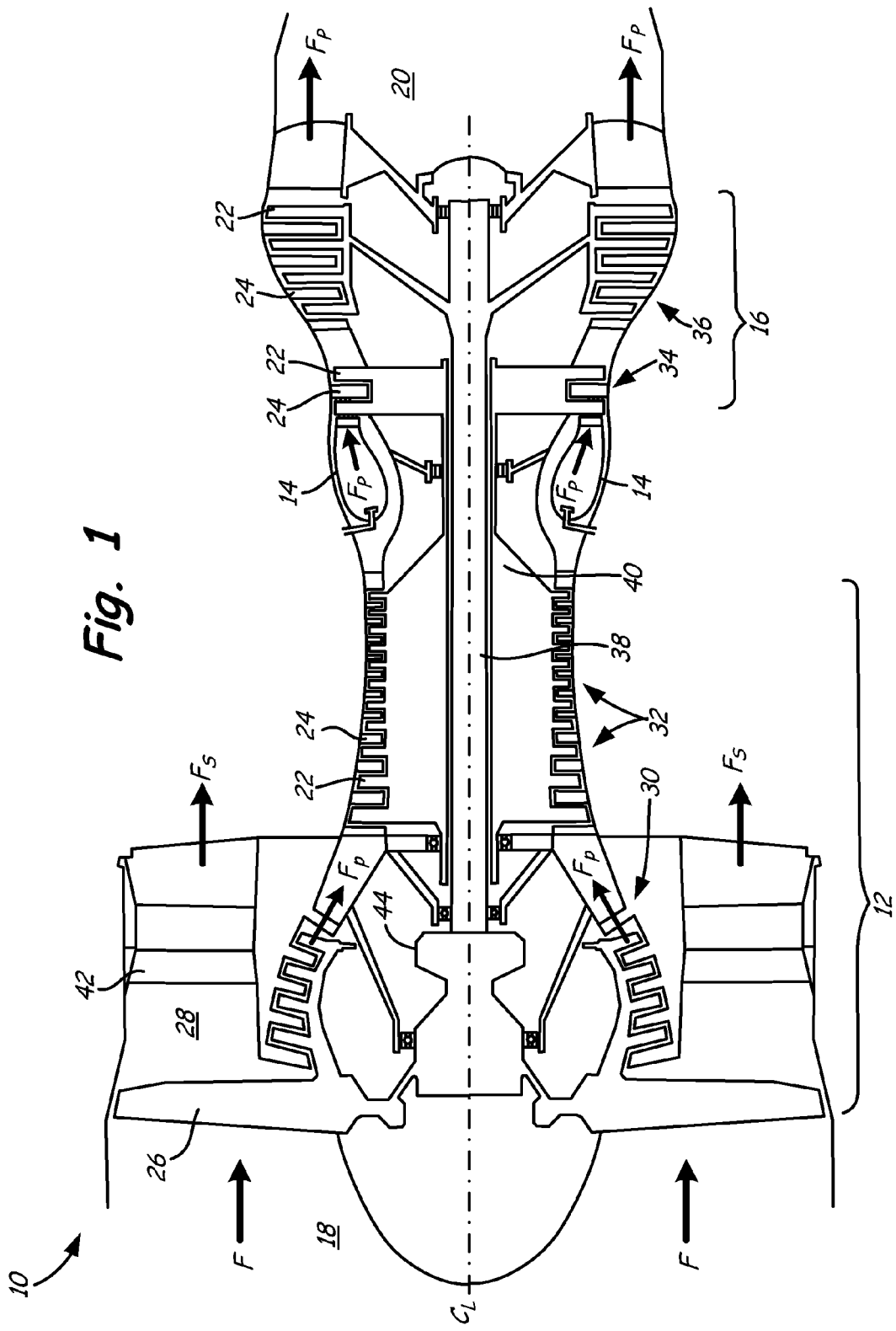
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
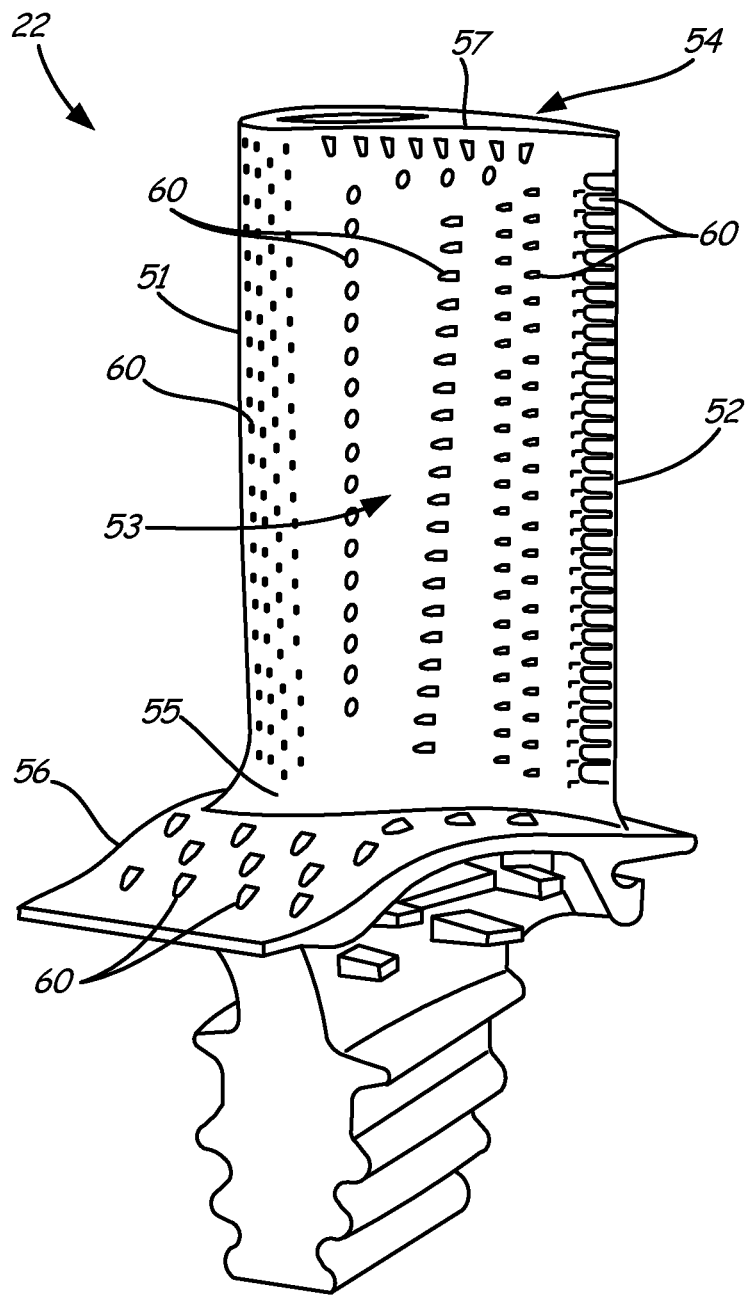
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
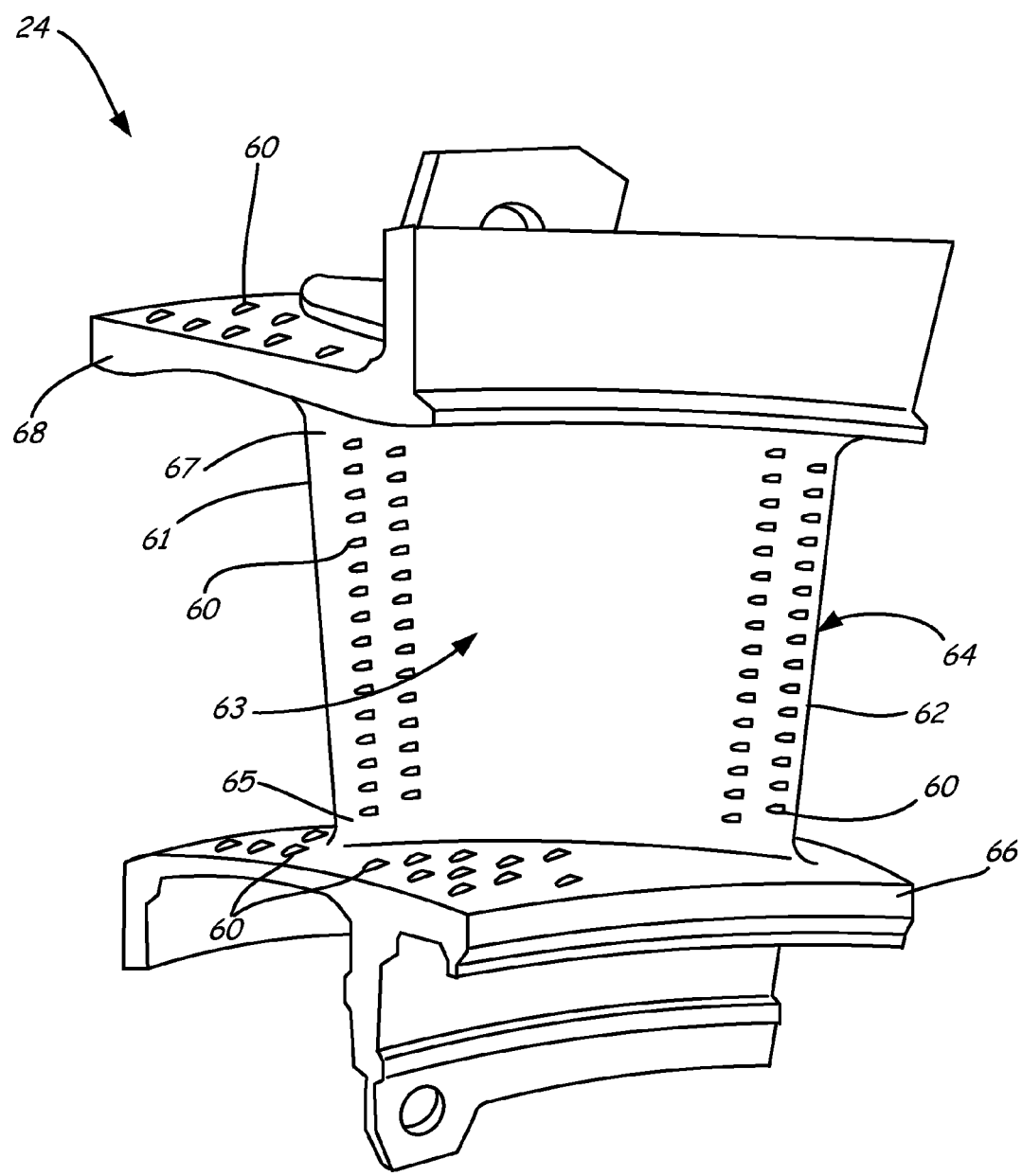
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Figure 3:
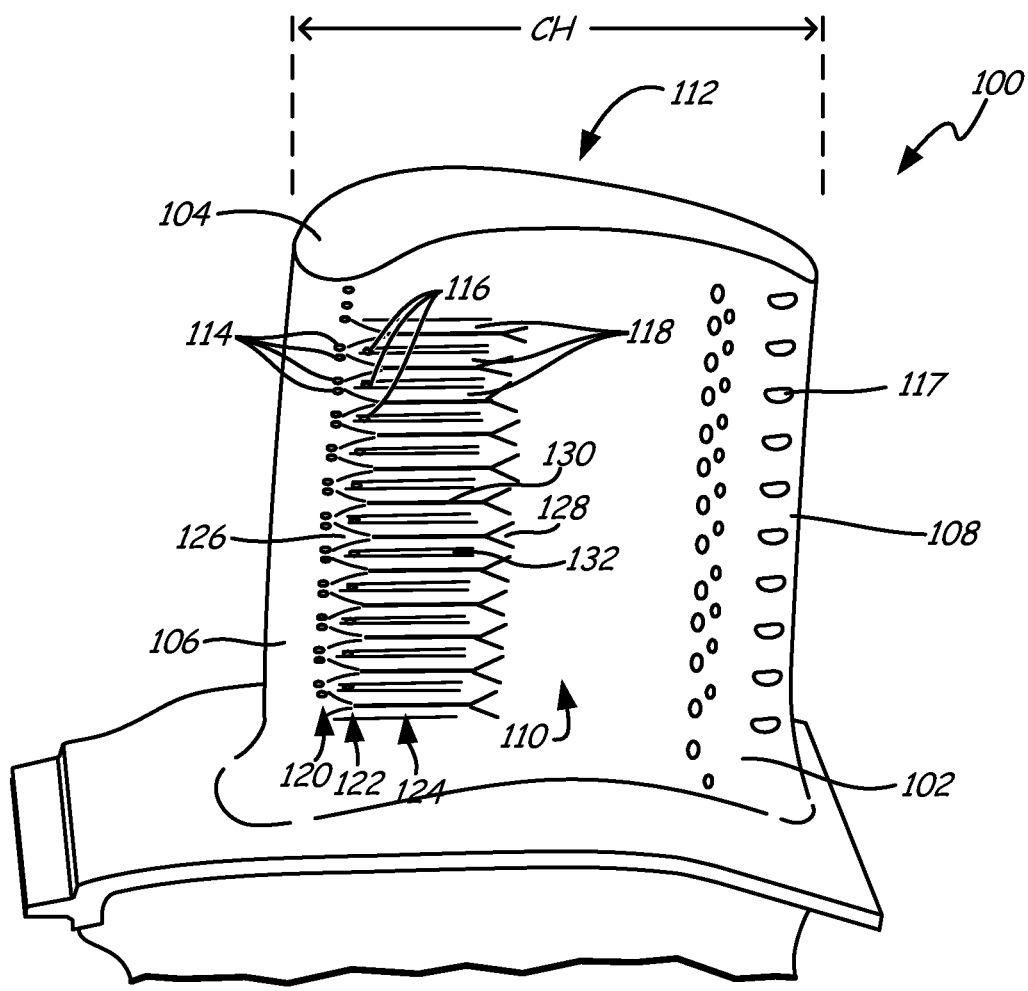
FIG. 3 is a perspective view of a rotor blade showing a cooling configuration in accordance with the present disclosure.

FIG. 3 is a perspective view of airfoil or rotor blade 100. Rotor blade 100 includes root section 102, tip section 104, leading edge 106, trailing edge 108, pressure or concave surface (front) 110, suction or convex surface (back) 112, showerhead cooling holes 114, pressure surface cooling holes 116, trailing edge cooling holes 117, and protuberances 118. Showerhead cooling holes 114 are arranged in first column 120, pressure surface cooling holes 116 are arranged in second column 122, and protuberances 118 are arranged in third column 124. Each protuberance 118 has upstream end 126, downstream end 128, peak or maxima 130, and trough or minima 132. Protuberances 118 effect cooling film air on pressure surface 110 of rotor blade 100.

Rotor blade 100 is similar to rotor airfoil 22 described above with reference to FIG. 2A. Rotor blade 100 extends radially from an inner diameter (ID) or root section 102 to an outer diameter (OD) or tip section 104. Rotor blade 100 extends axially from leading edge 106 to trailing edge 108 with trailing edge 108 located downstream of leading edge 106. Pressure surface 110 and suction surface 112 form the major opposing surfaces or walls of rotor blade 100. Pressure surface 110 and suction surface 112 both extend radially from root section 102 to tip section 104 and axially between leading edge 106 and trailing edge 108.

A plurality of cooling holes extend into rotor blade 100 and have outlets positioned along pressure surface 110. As shown in FIG. 3, showerhead cooling holes 114 are located near leading edge 106, pressure surface cooling holes 116 are located between leading edge 106 and trailing edge 108, and trailing edge cooling holes 117 are located near trailing edge 108. Additional cooling holes are also possible on rotor blade 100 (e.g. see cooling outlets 60 on airfoil 22 of FIG. 2A). For example, additional showerhead cooling holes 114, pressure surface cooling holes 116, and/or trailing edge cooling holes 117 are possible.

Protuberances 118 extend transversely from pressure surface 110 and create an undulating contour along a portion of pressure surface 110. Protuberances are located axially between leading edge 106 and trailing edge 108. In the depicted embodiment, protuberances 118 are located just downstream of showerhead cooling holes 114 and leading edge 106. Protuberances 118 extend axially along about 10-50% of chord length CH (chord length CH defines a length of airfoil 100 as measured by a straight line extending between leading edge 106 and trailing edge 108) of rotor blade 100. In the depicted embodiment, protuberances 118 extend axially along about 30% of the upstream portion of pressure surface 112.

Showerhead cooling holes 114 are arranged into first column 120, pressure surface cooling holes 116 are arranged into second column 122, and protuberances 118 are arranged into third column 124. First column 120, second column 122, and third column 124 each extend radially from root section 102 to tip section 104. First column 120 is located upstream on pressure surface 110 just downstream of leading edge 106. Second column 122 and third column 124 are both located downstream of, and extend parallel to, first column 120. In the depicted embodiment, first column 120, second column 122, and third column 124 are located in flow series on the upstream portion (approximately the first third) of rotor blade 100.

Each protuberance 118 has upstream end 126, and an axially opposite downstream end 128. Both upstream end 126 and downstream end 128 are tapered, ramped, or inclined to gradually transition from substantially flat pressure surface 110 to peak 130 of protuberance 118. In the depicted embodiment, upstream end 126 is more steeply inclined than downstream end 128 which is more gradually inclined. Both radially upper sides and radially lower sides of protuberances 118 are concave and curved to connect troughs 132 to peaks 130 like a wave. Upstream ends 126 are located just downstream of showerhead cooling holes 114. Axially elongated centers extend between upstream ends 126 and downstream ends 128. Downstream ends 128 can be located near mid-chord of rotor blade 100. Each protuberance has peak or maxima 130 and trough or minima 132. Each trough 132 is aligned to be axially downstream of two showerhead cooling holes 114. A single pressure surface cooling hole 116 is located in each trough 132. The ratio of showerhead cooling holes 114 to pressure surface cooling holes 116 is about 2:1, although the invention is not so limited.

As described with reference to FIGS. 2A and 2B, cooling fluid (e.g. compressor air) flows through cooling passageways within rotor blade 100. These cooling passageways terminate at cooling outlets (e.g. outlets of showerhead cooling holes 114, pressure surface cooling holes 116, and trailing edge cooling holes 117), which deliver a thin layer or film of cooling fluid onto outer surfaces of rotor blade 100. In FIG. 3, this film of cooling fluid will protect pressure surface 110 from high temperature working air flow. Protuberances 118 draw cooling air exiting showerhead cooling holes 114 into troughs 132 and along pressure surface 110. Once within troughs 132 the air from showerhead cooling holes 114 interacts with air exiting pressure surface cooling holes 116, which jointly provide a film of cooling air along pressure surface 110. Accordingly, protuberances 118 interact with showerhead cooling holes 114 and pressure surface cooling holes 116 to facilitate the effectiveness of film cooling on pressure surface 110 of rotor blade 100.

Industry has required ever increasing efficiency from gas turbine engines to reduce fuel burn and operating costs. This has led to an increase in turbine inlet temperatures necessitating development of new and exotic methods of cooling gas path airfoil hardware. Traditional cooling methods have focused on internal convective cooling, exterior film cooling using ejected coolant gas, and material coatings. The present disclosure improves on known external film cooling techniques. Film coolant produces a protective layer of cool air on the surface of the airfoil (e.g. pressure surface 110), thereby insulating the surface from the mainstream hot gasses. The use of film cooling air, while allowing higher turbine operating temperatures, imposes a thermodynamic penalty to the engine proportional to the amount of coolant used. It is imperative to efficiently use the cooling air for maximum effectiveness.

Cooling holes ejecting film cooling air into the mainstream gas path are known to generate kidney shaped vortices. These vortices enhance interaction between the mainstream gas path and the film cooling jet to the detriment of the film cooling effectiveness. The downwash of these vortices entrain hot mainstream gas below the film coolant jet drastically decreasing the film cooling effectiveness.

Figure 4:
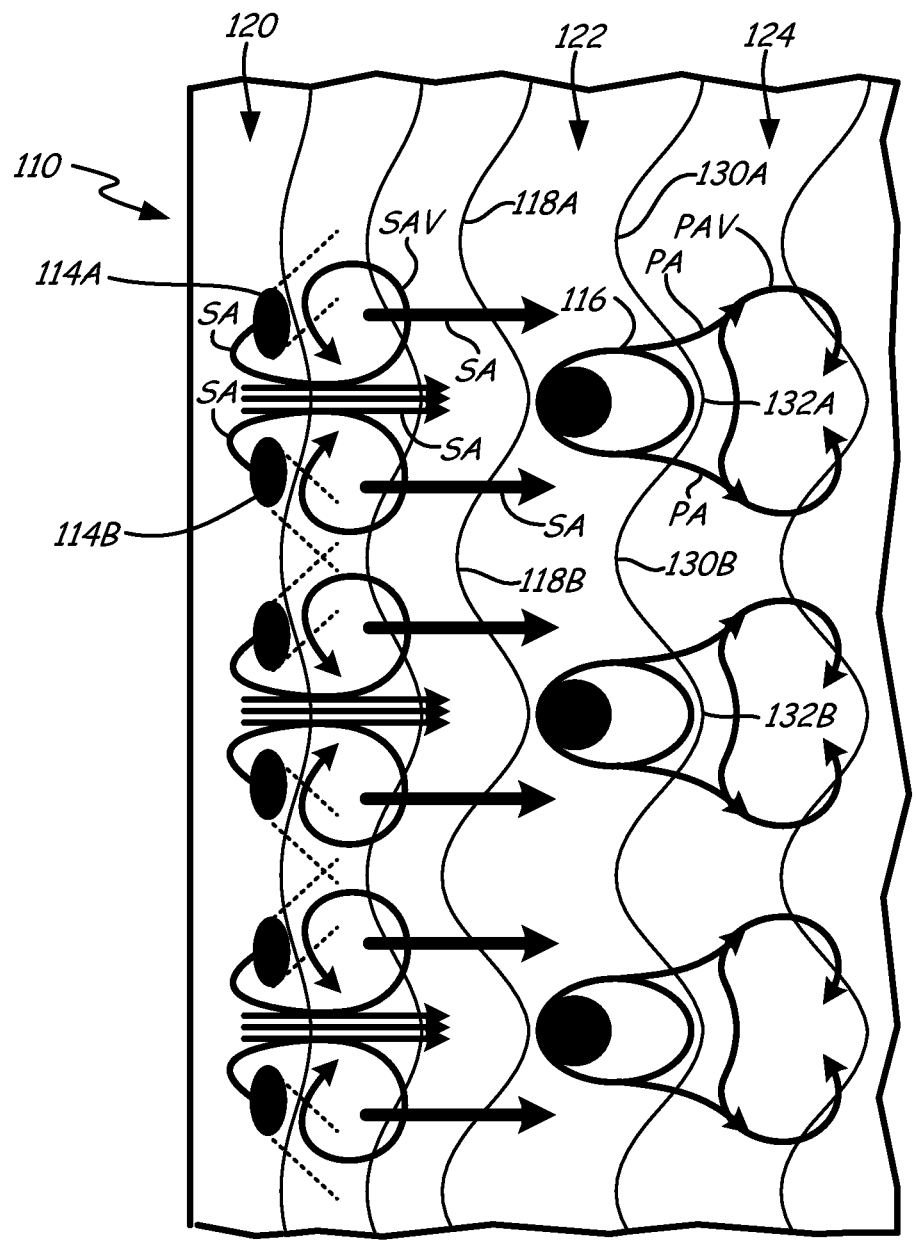
FIG. 4 is a schematic view of the pressure surface of the rotor blade from FIG. 3 showing fluid behavior.

As shown in FIGS. 3-4, the present disclosure proposes a cooling scheme for a pressure surface 110 including showerhead cooling holes 114, pressure surface cooling holes 116, and protuberances 118. Protuberances 118 are located downstream of showerhead cooling holes 114 and pressure side cooling holes 116 are located in troughs in order to maximize cooling along pressure surface 110 of rotor blade 100. This cooling scheme will result in more effective film cooling that minimizes the amount of cooling air needed, increases overall turbine performance, and reduces metal operating temperatures. Lower operating costs and higher performance are expected.

FIG. 4 is a schematic view of pressure surface 110 of rotor blade 100 from FIG. 3 showing fluid behavior. Depicted in FIG. 4 are showerhead cooling holes 114, pressure surface cooling holes 116, and protuberances 118. Showerhead cooling holes 114 (e.g. first showerhead cooling hole 114A and second showerhead cooling hole 114B) are arranged into first column 120, pressure surface cooling holes 116 are arranged into second column 122, and protuberances 118 (e.g. first protuberance 118A and second protuberance 118B) are arranged into third column 124. Also shown are peak or maxima 130A and trough or minima 132A for first protuberance 118A, as well as peak or maxima 130B and trough or minima 132B for second protuberance 118B. Fluid behavior is depicted by arrows identified as showerhead cooling air SA, showerhead cooling air vortex SAV, pressure surface cooling air PA, or pressure surface cooling air vortex PAV.

Showerhead cooling holes 114 are the upstream most features shown on pressure surface 110. Showerhead cooling holes 114 are arranged in groups of two, for which first showerhead cooling hole 114A and second showerhead cooling hole 114B serve as an example. First showerhead cooling hole 114A is located radially above (i.e. toward tip section 104 from FIG. 3) second showerhead cooling hole 114B. Both first showerhead cooling hole 114A and second showerhead cooling hole 114B are angled at about 45 degrees with respect to pressure surface, but in alternate directions. The outlet of first showerhead cooling hole 114A faces in a first direction (i.e. toward root section 102 from FIG. 3), while the outlet of second showerhead cooling hole 114B faces in a second direction that is opposite the first direction (i.e. toward tip section 104 from FIG. 3).

First showerhead cooling hole 114A and second showerhead cooling hole 114B are centered radially between first protuberance 118A and second protuberance 118B. As shown in FIG. 4, showerhead cooling holes 114 can be located in a straight radial line with one another, but other axially staggered configurations are also contemplated. While showerhead cooling holes 114 are arranged into a single first column 120 in FIG. 4, additional columns of showerhead cooling holes 114 are also possible. In the depicted embodiment, the outlets of the showerhead cooling holes 114 have diameters of about 0.14-0.15 inches (about 0.36-0.38 millimeters), but other sizes are contemplated. Showerhead cooling hole passageways within pressure surface 110 are circular in cross section while the outlets are elliptical in cross section, but the disclosure is not so limited.

Located axially downstream of first showerhead cooling hole 114A and second showerhead cooling hole 114B is a single pressure surface cooling hole 116. The single pressure surface cooling hole 116 is located an equal distance from first showerhead cooling hole 114A and second showerhead cooling hole 114B. This pattern repeats radially along pressure surface 110 with a single pressure surface cooling hole 116 in second column 122 being associated with two showerhead cooling holes (e.g. first showerhead cooling hole 114A and second showerhead cooling hole 114B) in first column 120. In other words, the cooling outlets are grouped into sets of three or a tri-set including one downstream pressure surface cooling hole 116 and two upstream showerhead cooling outlets 114 in a triangular pattern. Pressure surface cooling hole 116 is located centrally within first trough 132A. In other words, pressure surface cooling hole 116 is located an equal radial distance between first protuberance 118A and second protuberance 118B. In the depicted embodiment, the outlet of pressure surface cooling hole 116 has a diameter of about 0.12-0.24 inches (about 0.30-0.61 millimeters), although the invention is not so limited. Pressure surface cooling hole 116 can be diffused, laid-back, circular, or take any other configuration known in the art of cooling holes.

Protuberances or bumps 118 are transverse projections from pressure surface 110, extend axially along pressure surface 110, and are arranged into a radially extending third column 124. Protuberances 118 have peaks, maxima, or crests 130 that are arranged parallel to one another and are uniformly spaced axially by minima, depressions, or troughs 132. In the depicted embodiment, protuberance 118 height (i.e. distance from minima 132 to maxima 132) is between about 30-40 mils (about 0.762-1.02 millimeters) and pitch is about 90 mils (about 2.29 millimeters).

Alternating peaks 130 and troughs 132 form an undulating contour for pressure surface 110. This radial sinusoidal contouring for pressure surface 110 resembles a whale flipper. Third column 124 of protuberances 118 can extend all the way to tip section 104 or be spaced from tip section 104 such that the section of pressure surface 110 adjacent tip section 104 is flat and devoid of protuberances 118. The height of protuberances 118 can vary radially depending on cooling needs of airfoil 100. The periodic protuberances 118 can be aligned in straight rows as depicted, or can fan radially outward as they extend axially toward trailing edge 108.

Contouring of pressure surface 110 increases the effectiveness of cooling air exiting showerhead cooling holes 114 and pressure surface cooling holes 116. Cooling air exits first showerhead cooling hole 114A and second showerhead cooling hole 114B and flows downstream to jointly affect air exiting pressure surface cooling hole 116. Protuberances 118 affect both air exiting showerhead cooling holes 114 and air exiting pressure surface cooling hole 116 by turning and encouraging counter rotating vortices that force the cooling air down into troughs 132. The cooling film is more effectively utilized along pressure surface 110 by preventing mixing or entrainment with hot working air.

Showerhead cooling air SA exits outlets of first showerhead cooling hole 114A and second showerhead cooling hole 114B near leading edge 106 of airfoil 100. A portion of showerhead cooling air SA will flow centrally along first trough 132A in a jet while another portion of showerhead cooling air SA forms showerhead cooling air vortex SAV rotating counter-clockwise. The alternating angles of the outlets showerhead cooling hole 114 help induce showerhead cooling air vortex SAV. Pressure surface cooling air PA exits an outlet of pressure surface cooling hole 116 at a location downstream of showerhead cooling holes 114. Pressure surface cooling air PA forms pressure surface cooling air vortex PAV rotating clockwise, opposite to the spin of showerhead cooling air vortex SAV. These counter-rotating vortices are encouraged by the contouring of pressure side 110 (e.g. protuberances 118 having peaks 130 and troughs 132). The counter-rotating vortices energize fluid flow across pressure surface cooling outlets 116 and convect downstream to mix within first trough 132A, thereby accelerating flow and enhancing film cooling of pressure surface 110 of airfoil 100.

Showerhead cooling air vortex SAV acts as a buffer or barrier to hot working air passing by rotor blade 100 and prevents mixing or entrainment of pressure surface cooling air PA with hot working air. Pressure surface cooling air vortex PAV is forced to lie down and remain in trough 132 and recirculate along trough 132, thereby providing more effective cooling along pressure surface 100. The counter-rotating vortices (i.e. showerhead cooling air vortex SAV and pressure surface cooling air vortex PAV) will crash any kidney-shaped vortices known to be generated by a single hole. Attachment of pressure surface cooling air PA from pressure surface cooling holes 116 is also increased.

The disclosed cooling scheme utilizing showerhead cooling holes 114, pressure surface cooling holes 116, and protuberances 118 can provide the following benefits: 1) Reduce turbine metal operating temperatures through increased film effectiveness driving lower operating costs for the customer; 2) Minimize the amount of cooling air needed to film cool turbine parts increasing overall machine performance; and 3) Reduce the number of cooling holes needed per square inch of cooling area reducing part manufacturing costs.

Figure 5:
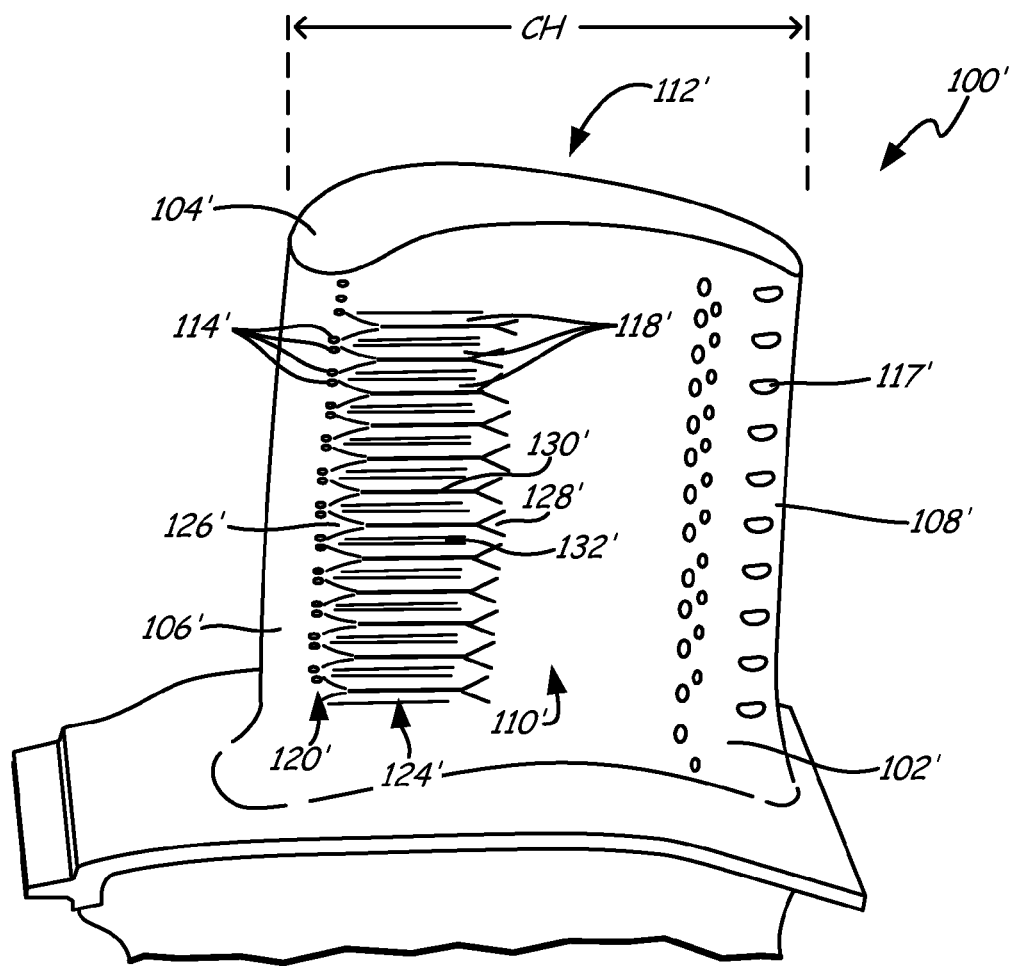
FIG. 5 is a perspective view of a rotor blade showing an alternate cooling configuration in accordance with the present disclosure.

FIG. 5 is a perspective view of airfoil or rotor blade 100'. Rotor blade 100' includes root section 102', tip section 104', leading edge 106', trailing edge 108', pressure or concave surface (front) 110', suction or convex surface (back) 112', showerhead cooling holes 114', trailing edge cooling holes 117', and protuberances 118'. Showerhead cooling holes 114' are arranged in first column 120', and protuberances 118' are arranged in third column 124'. Each protuberance 118' has upstream end 126', downstream end 128', peak or maxima 130', and trough or minima 132'. Protuberances 118' effect cooling film air on pressure surface 110' of rotor blade 100.

Rotor blade 100' is similar to rotor blade 100 described above with reference to FIG. 3. Rotor blade 100' extends radially from an inner diameter (ID) or root section 102' to an outer diameter (OD) or tip section 104'. Rotor blade 100' extends axially from leading edge 106' to trailing edge 108' with trailing edge 108' located downstream of leading edge 106'. Pressure surface 110' and suction surface 112' form the major opposing surfaces or walls of rotor blade 100'. Pressure surface 110' and suction surface 112' both extend radially from root section 102' to tip section 104' and axially between leading edge 106 and trailing edge 108'.

A plurality of cooling holes extend into rotor blade 100' and have outlets positioned along pressure surface 110'. As shown in FIG. 5, showerhead cooling holes 114' are located near leading edge 106', and trailing edge cooling holes 117' are located near trailing edge 108'. Additional cooling holes are also possible on rotor blade 100' (e.g. see cooling outlets 60 on airfoil 22 of FIG. 2A). For example, additional showerhead cooling holes 114', and/or trailing edge cooling holes 117' are possible. The primary difference between rotor blade 100 and rotor blade 100' is that pressure surface cooling holes 116 present on rotor blade 100 in FIG. 3 are not present on rotor blade 100' in FIG. 5.

Protuberances 118' extend transversely from pressure surface 110' and create an undulating contour along a portion of pressure surface 110'. Showerhead cooling holes 114' are arranged into first column 120', and protuberances 118' are arranged into third column 124'. Each protuberance 118' has upstream end 126', and an axially opposite downstream end 128'.

As described with reference to FIGS. 2A and 2B, cooling fluid (e.g. compressor air) flows through cooling passageways within rotor blade 100'. These cooling passageways terminate at cooling outlets (e.g. outlets of showerhead cooling holes 114', and trailing edge cooling holes 117'), which deliver a thin layer or film of cooling fluid onto outer surfaces of rotor blade 100'. In FIG. 5, this film of cooling fluid will protect pressure surface 110' from high temperature working air flow. Protuberances 118' draw cooling air exiting showerhead cooling holes 114' into troughs 132' and along pressure surface 110'. Accordingly, protuberances 118' interact with showerhead cooling holes 114' to facilitate the effectiveness of film cooling on pressure surface 110' of rotor blade 100'.

The contouring of pressure surface 110 (i.e. peaks 130 and troughs 132) could be manufactured either in the airfoil casting or added onto the part utilizing currently available ceramic coatings with the holes machined in. Cooling holes spacing and pattern reoccurrence can take many forms and will be driven by specific part configurations and operational needs.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

An airfoil can include a suction surface, a pressure surface, a first showerhead cooling hole, and a second showerhead cooling hole. The suction surface and the pressure surface can both extend axially between a leading edge and a trailing edge, as well as radially from a root section to a tip section. The first showerhead cooling hole and the second showerhead cooling hole can both extend into the pressure surface near the leading edge, and can be angled in opposing directions.

The system of the preceding paragraph can optionally include, additionally and/or alternatively, any one or more of the following features, configurations and/or additional components:

an outlet of the first showerhead cooling hole can face the root section;

an outlet of the second showerhead cooling hole can face the tip section;

the first showerhead cooling hole and the second showerhead cooling hole can be angled at about 45 degrees with respect to the pressure surface;

a first protuberance and a second protuberance spaced radially apart by a trough can both extend axially along a pressure surface from a location adjacent the first and second showerhead cooling holes;

a pressure surface cooling hole can be located in a center of the trough;

the first protuberance can be positioned radially between the first showerhead cooling hole and the tip region; and/or the second protuberance can be positioned radially between the second showerhead cooling hole and the root section.

A component for a gas turbine engine can include a convex surface, a concave surface, bumps, upstream cooling holes, and downstream cooling holes. Both the convex surface and the concave surface can extend radially from a root section to a tip section and axially from a leading edge to a trailing edge. The bumps can extend transversely from the concave surface and can have upstream ends located near the leading edge and axially elongated centers extending towards the trailing edge. The upstream cooling holes can have outlets located on the concave surface axially between the leading edge and the upstream ends of the bumps. The downstream holes can have outlets located on the concave surface radially between the axially elongated centers of the bumps.

The component of the preceding paragraph can optionally include, additionally and/or alternatively, any one or more of the following features, configurations and/or additional components:

the upstream cooling holes can be arranged into a first radial column, the bumps can be arranged into a second radial column, and the downstream holes can be arranged into a third radial column;

a ratio of the upstream cooling holes to the downstream cooling holes can be about 2:1;

the upstream ends of the bumps can be inclined;

the bumps can have include downstream ends; and/or the upstream ends can be inclined more steeply than the downstream ends.

An airfoil for gas turbine engine can include a pressure surface, a suction surface, and showerhead cooling holes. The pressure surface and the suction surface can both extend between a leading edge and a trailing edge, as well as between a root section and a tip section. A portion of the pressure surface can have an undulating contour defined by peaks and troughs. The showerhead cooling holes can have outlets on the pressure surface that are located upstream of the portion of the pressure surface having the undulating contour.

The airfoil of the preceding paragraph can optionally include, additionally and/or alternatively, any one or more of the following features, configurations and/or additional components:

pressure surface cooling holes with outlets that are located on the portion of the pressure surface having the undulating contour;

the outlets of the pressure surface cooling holes can be located in the troughs;

two showerhead cooling holes can be aligned with a single pressure surface cooling hole;

the showerhead cooling holes can be angled in alternating directions; and/or the showerhead cooling holes can be angled at about 45 degrees with respect to the pressure surface.

The invention claimed is:

1. An airfoil comprising:
a suction surface and a pressure surface, the suction surface and the pressure surface both extending axially between a leading edge and a trailing edge, as well as radially from a root section to a tip section;
a first showerhead cooling hole and a second showerhead cooling hole, the first showerhead cooling hole and the second showerhead cooling hole both extending into the pressure surface near the leading edge, wherein the first showerhead cooling hole and the second showerhead cooling hole are angled in opposing directions; and
a first protuberance and a second protuberance spaced radially apart by a trough, the first protuberance and the second protuberance both extending axially along the pressure surface from a location adjacent the first and second showerhead cooling holes.

2. The airfoil of claim 1, wherein an outlet of the first showerhead cooling hole is facing the root section.

3. The airfoil of claim 2, wherein an outlet of the second showerhead cooling hole is facing the tip section.

4. The airfoil of claim 1, wherein the first showerhead cooling hole and the second showerhead cooling hole are angled at about 45 degrees with respect to the pressure surface.

5. The airfoil of claim 1, further comprising:
a pressure surface cooling hole located in a center of the trough.

6. The airfoil of claim 1, wherein the first protuberance is positioned radially between the first showerhead cooling hole and the tip section, and the second protuberance is positioned radially between the second showerhead cooling hole and the root section.

7. A component for a gas turbine engine, the component comprising:
a convex surface and a concave surface, both the convex surface and the concave surface extending radially from a root section to a tip section and axially from a leading edge to a trailing edge;
bumps extending transversely from the concave surface, the bumps having upstream ends located near the leading edge and axially elongated centers extending towards the trailing edge;
upstream cooling holes having outlets located on the concave surface axially between the leading edge and the upstream ends of the bumps;
downstream holes having outlets located on the concave surface radially between the axially elongated centers of the bumps.

8. The component of claim 7, wherein the upstream cooling holes are arranged into a first radial column, the bumps are arranged into a second radial column, and the downstream holes are arranged into a third radial column.

9. The component of claim 8, wherein ratio of a upstream cooling holes to the downstream cooling holes is about 2:1.

10. The component of claim 7, wherein the upstream ends of the bumps are inclined.

11. The component of claim 10, wherein the bumps have inclined downstream ends.

12. The component of claim 11, wherein the upstream ends are inclined more steeply than the downstream ends.

13. An airfoil for a gas turbine engine, the airfoil comprising:
a pressure surface and a suction surface, the pressure surface and the suction surface both extending between a leading edge and a trailing edge, as well as between a root section and a tip section, a portion of pressure surface having an undulating contour defined by peaks and troughs; and
showerhead cooling holes having outlets on the pressure surface, the outlets of the showerhead cooling holes are located upstream of the portion of the pressure surface having the undulating contour.

14. The airfoil of claim 13, further comprising:
pressure surface cooling holes having outlets on the pressure surface, the outlets of the pressure surface cooling holes are located on the portion of the pressure surface having the undulating contour.

15. The airfoil of claim 14, wherein the outlets of the pressure surface cooling holes are located in the troughs.

16. The airfoil of claim 15, wherein two showerhead cooling holes are aligned with a single pressure surface cooling hole.

17. The airfoil of claim 14, wherein the showerhead cooling holes are angled in alternating directions.

18. The airfoil of claim 17, wherein the showerhead cooling holes are angled at about 45 degrees with respect to the pressure surface.

* * * * *